United States Patent [19]

Takahashi

[11] Patent Number: 4,897,869
[45] Date of Patent: Jan. 30, 1990

[54] DATA COMMUNICATION APPARATUS

[75] Inventor: Masatomo Takahashi, Tokyo, Japan

[73] Assignee: Canon Kabushiki Kaisha, Tokyo, Japan

[21] Appl. No.: 337,860

[22] Filed: Apr. 14, 1989

[30] Foreign Application Priority Data

May 17, 1988 [JP] Japan .................................. 63-121089

[51] Int. Cl.<sup>4</sup> .......................................... H04M 11/08
[52] U.S. Cl. .................................... 379/100; 379/387; 358/400
[58] Field of Search ............... 379/100, 387, 399, 193, 379/199; 358/400

[56] References Cited

U.S. PATENT DOCUMENTS 4,641,133  2/1987  Ono ................................. 358/400 X

Primary Examiner—Stafford D. Schreyer
Attorney, Agent, or Firm—Fitzpatrick, Cella Harper & Scinto

[57] ABSTRACT

A data communication apparatus which is able to set up a plurality of communication processes successively via a communication line is provided, in which the apparatus notifies an operator when the communication is not busy and prohibits establishment of a successive communication process for another process in response to a reservation of an interruption of the plurality of communication processes. As a result, operators can make an interruption for another purpose while the apparatus successively carries out the plurality of communication processes.

16 Claims, 2 Drawing Sheets

DATA COMMUNICATION APPARATUS

BACKGROUND OF THE INVENTION

1. Field of the Invention

The present invention relates to a data communication apparatus which sets up a plurality of communication processes successively to communicate data.

2. Related Art

A conventional data communication apparatus such as, for example, a facsimile apparatus, performs only one procedure, e.g., a copying or a communication process, at a time. Recently, however, one facsimile apparatus which is able to make a reservation of other communication processes during one communication process, has been developed. This kind of facsimile apparatus has an image memory for storing a large amount of image data of documents to be sent, and makes a plurality of calls sending image data from the image memory. Using this basic feature, a sequential broad casting operation process can be performed.

However, in the above-mentioned facsimile apparatus, it is very difficult for the operator to confirm when a telephone line is being used for communication, because the image data is transmitted from the image memory. On the other hand, in a conventional facsimile apparatus where transmission from memory is not used, it is easy for the operator to recognize when the line is occupied simply by looking at the document being sent, because the document moves as it is read by a reading device during the communication process.

When the operator wants to use the telephone line, e.g., for making a call to speak with the operator on the other side or to make a call to send an urgent document, the operator has to choose a time when the facsimile apparatus has released the telephone line and has not occupied it for the next communication. Even with a display showing whether the telephone line is busy or not, the operator has to wait for the display changes to show that the line is not busy. If the line is busy for a long time, the operator cannot leave the apparatus for a long time.

This problem occurs not only with a facsimile apparatus but with other data communication apparatus such as those which are for communicating character code data, or numerical data. In these other types of data communication apparatus, the ease of handling and operation is deteriorating seriously with increasing machine complexity.

In other words, data communication apparatus of types which set up a plurality of calls successively are not capable of informing the operator as to when the operator will be able to use the line, and the operator cannot reserve time for that purpose for himself or herself. Therefore, the ease of handling and operation of the data communication apparatus is not fully satisfactory.

SUMMARY OF THE INVENTION

A purpose of the present invention is to provide a data communication apparatus which overcomes the above-mentioned shortcomings.

According to one aspect of the present invention, a data communication apparatus is provided which is able to set up a plurality of communication processes successively, and which notifies the operator that the communication line is not busy, and prohibits the setting up of a successive communication process, in response to reservation of an interruption of the plurality of communication processes. Thereby, it is possible for an operator to make an interruption for other use while the apparatus carries out a plurality of communication processes successively.

According to another aspect of the present invention, a data communication apparatus is provided which is able to set up a plurality of communication processes successively, and which has an operating element so as to be manually operable while a communication process is being performed, and changing means for changing a time period between a termination of the communication process and a starting time of a successive communication process in accordance with whether the operating element has been operated or not. As a result of these features, an operator can easily make an interruption for another process while the plurality of communication processes is successively carried out.

The foregoing summary of certain advantageous features of the invention is provided in order that the detailed description of the preferred embodiment thereof that follows may be better understood, and in order that the present contribution to the art may be better appreciated. There are, of course, additional features of the invention that will be described in that detailed description with reference to the accompanying drawing. Those skilled in the art will appreciate that the conception upon which this disclosure is based may readily be utilized as a basis for designing other structures or methods for carrying out the purposes of the invention. It will be understood what the claims are to be regarded as including such other constructions and methods as do not depart from the spirit and scope of the invention.

DETAILED DESCRIPTION OF THE PREFERRED EMBODIMENT

Figure 1:
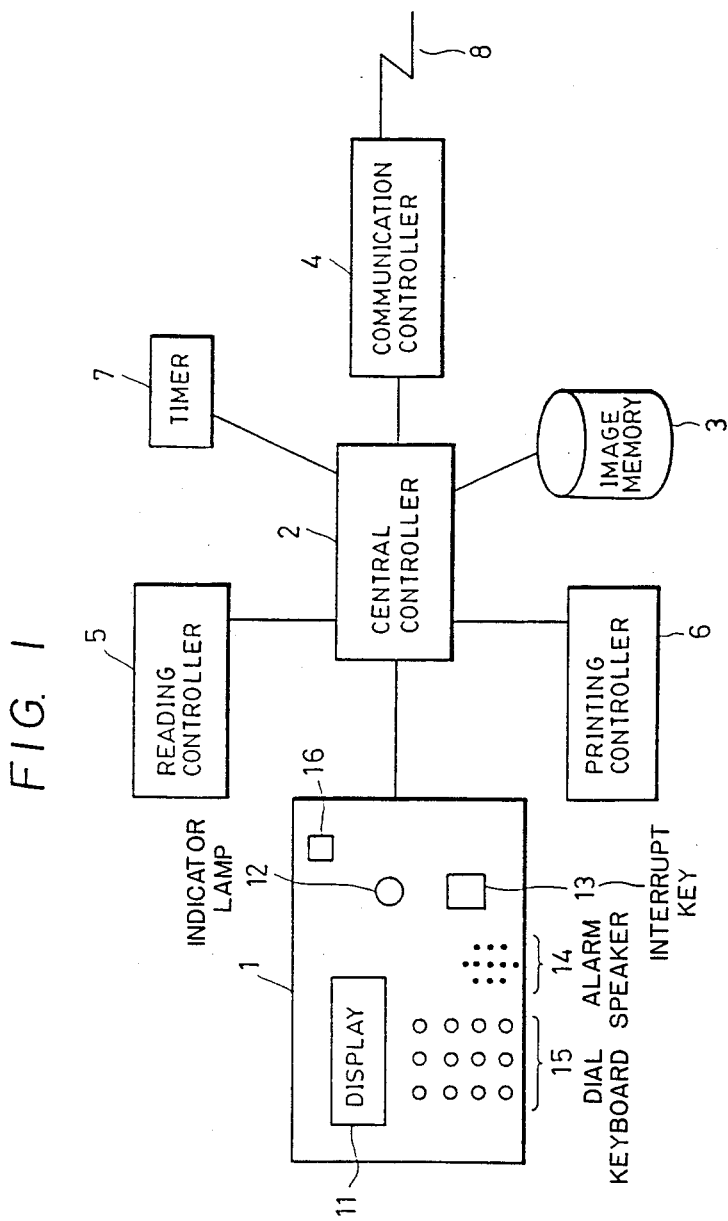
FIG. 1 is a block diagram showing a structure of a facsimile apparatus according to the preferred embodiment of the present invention.

The facsimile apparatus shown in FIG. 1 includes an operating unit 1 which comprises a display 11 for displaying communication modes, destination stations, time, and so on, an interrupting lamp 12 for indicating interruptions as explained below, an interrupting key 13 for manually designating that an interruption is to be made, an alarm speaker 14 for informing an operator that the communication line has been released, and a dial key unit 15 for making a call. The interrupting lamp 12 indicates, specifically, that the interruption key 13 has been depressed.

A central controller 2 is provided for controlling all circuits of the facsimile apparatus, and for coding and decoding image data. The central controller 2 comprises a micro-computer, and peripheral devices of the micro-computer, e.g., a ROM for storing a control program of the microcomputer, and a RAM for temporarily storing data for use in the control operations of the micro-computer.

An image memory 3 is also provided for storing image data read by a reading controller 5.

A communication controller 4 is provided for carrying out network control, and for modulating an outgoing and demodulating an incoming communication signal.

The reading controller 5 is provided for reading original documents.

A printing controller 6 is provided for printing received image data and image data stored in the image memory 3.

A timer 7 is also provided for measuring time to be set.

Figure 2:
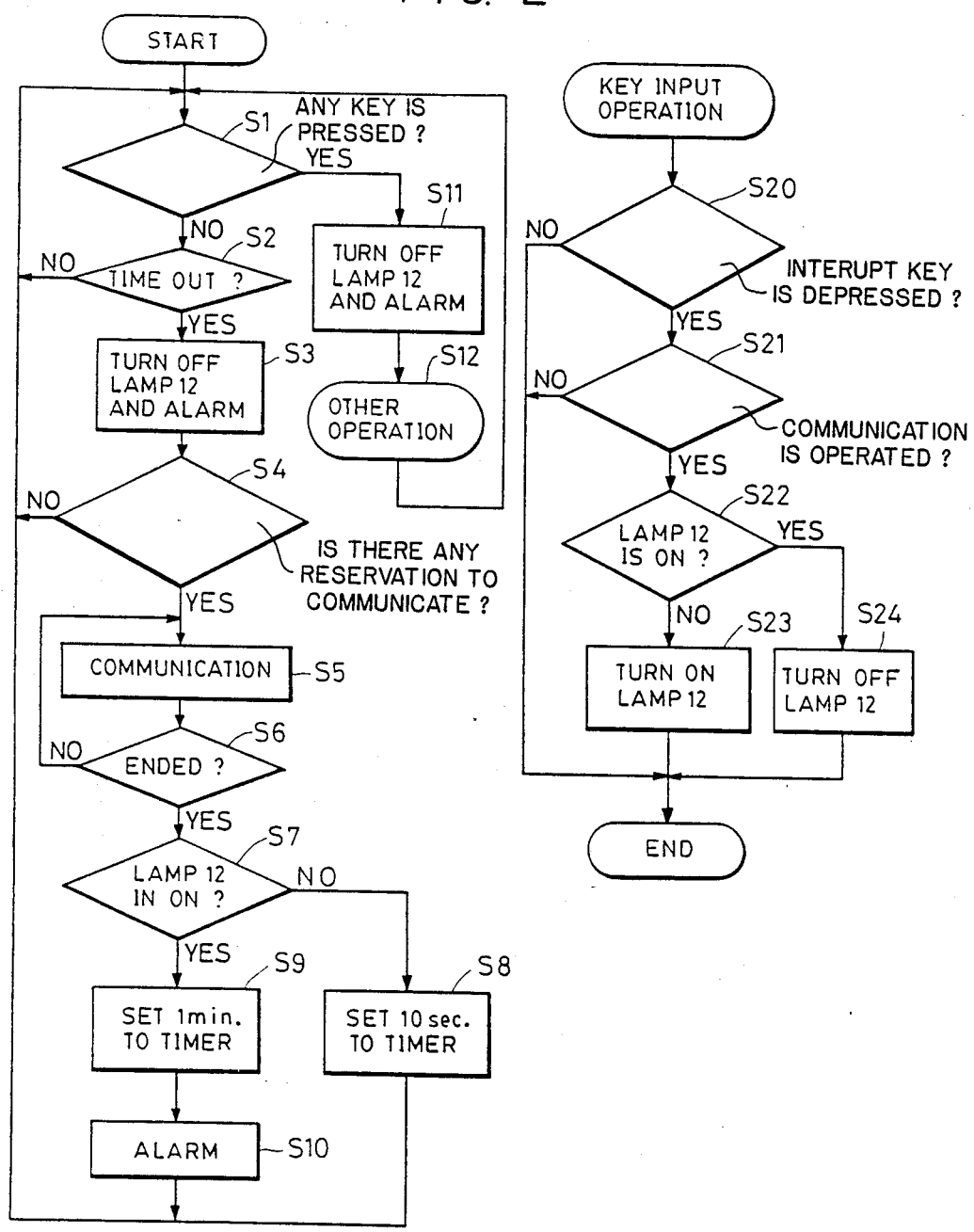
FIG. 2 is a flow chart illustrating a control operation of a central controller shown in FIG. 1.

FIG. 2 is a flow chart illustrating a control program of the central controller 2, which program is stored in the ROM of the controller 2.

The control operation of the apparatus is as follows, referring to FIG. 2.

In step S1, the controller 2 checks a key input, i.e., the controller 2 checks whether any key is being depressed or not. If no key input has occurred, that is, the operator has not operated any key to provide a key input, the procedure is advanced to step S2.

In step S2, the controller 2 checks whether the timer 7 has timed out or not. If so, in other words, if the count value of the timer 7 is "0", the controller 2 clears the interrupting lamp 12 and the alarm speaker 14. At this point in the flow, right after the procedure is initiated, the lamp 12 has not been on, and speaker 14 has not generated an alarm sound, so that nothing occurs in step S3.

In step S4, it is discriminated whether there is any reservation in the image memory 3 for transmission of image data. If so, the controller 2 causes the communication controller 4 to establish a communication line for transmission of the image data in the image memory, and starts the transmission. The communication is performed until completed, in steps S5 and S6.

Now, a key input operation shown by steps S20 through S24 is explained as follows. This key input routine is periodically performed even while communication is being performed, by an interrupt routine of the micro-computer 2.

In step S20, it is discriminated whether the interrupting key 13 of the operating unit 1 is depressed or not. If so, a check is made as to whether communication is now being performed or not, in step S21. If not, the depression of the interrupting key 13 is ignored as invalid key input. If the interrupting key 13 is depressed during the communication, the actuation of the interrupting key 13 is accepted by the controller 2 as valid key input, and it is checked whether the interrupting lamp 12 is on or not in step S22. If so, the interrupting lamp 12 is turned off in step S24. If not, the interrupting lamp 12 is turned on in step S23.

Now, the explanation of the procedure is back to step S7 of the main routine.

After the termination of the communication, in step S7, it is checked whether the interrupting lamp 13 is on or not. If so, the controller 2 sets one minute in the timer 7 and turns on the speaker 14 to produce an alarm sound to inform the operator that the telephone line has now been released.

Then, the procedure goes back to step S1, and a check is made for key input until the timer 7 times out. If any key, e.g., a copy start key 16 or the dial key 15 of the operating unit 1 is depressed before the timer 7 times out, the interrupting lamp 12 and the alarm sound are turned off in step S11, and the other operation designated by the key input is carried out in step S12. For example, if the dial key 15 is depressed a call is made via the telephone, or a call for sending an urgent document can be made, or if the copy start key 16 is depressed, the facsimile apparatus carries out the copy operation.

Thus, while the interrupting lamp 12 is on, an interruption will be accepted by the apparatus, and the alarm sound from the speaker 14 is used for informing the operator that the telephone line has been released.

If the operator depresses any key, the controller 2 recognizes that the operator is around the apparatus for operating it, and turns off the lamp 12 and the alarm sound.

In this embodiment, the controller 2 simply checks for key input, but the controller 2 might instead or also check whether a handset of the telephone is off hook.

In step S3, if the timer 7 has timed out, or the count value of the timer 7 becomes "0" before any key is depressed, the interrupting lamp 12 and the alarm sound are turned off. Then, if there is any reservation in the image memory to transmit image data, the facsimile apparatus restarts the communication. Further, if there is any other destination station to which the facsimile apparatus has not sent the image data in the sequential broadcasting, the facsimile apparatus restarts the sequential broadcasting.

If the interrupting lamp 12 is off in step S7, needless to say, the controller 2 sets 10 seconds in the timer 7, and the facsimile apparatus restarts the reserved communication after the 10 seconds have passed, as well as a conventional sequential broadcasting communication, or a data transmission from the memory.

In the above-mentioned embodiment, the timer is set for either one minute or 10 seconds, but it might be structured such that the operator can set the timer period, or select a period from among a number of predetermined values. In the latter case, the periods are preset in the RAM and are set in the timer in steps S8 and S9. In the former case, the period entered by the operator is stored in the RAM to control the timer. Thereby, the operator is able to set longer or shorter times in accordance with his or her convenience.

In the preferred embodiment, the alarm sound is on when the line is released by the facsimile apparatus, but it might be structured that when the interrupting key is depressed a telephone number of the operator is set and stored in the RAM by the operator, and controller 2 makes a call to the stored telephone number and lets the operator know of the release of the line by generating a voice output, e.g., "You can interrupt the facsimile", in step S10.

As mentioned above, in this embodiment, the operator is able to make a reservation to use the telephone line while the apparatus is operated for successive communication processes, and the apparatus is able to inform the operator of the release of the telephone line. As a result of these features, the operator can go back to his or her seat to work after making the reservation. Hence, the ease and efficiency of operation and of handling for the operator is improved.

Further, even if the operator moves from his or her seat after the reservation, or the operator's schedule is changed such that the operator no longer needs to interrupt, the facsimile apparatus can start the registered communication successively after the predetermined period elapsed. Thus, there is no adverse influence upon successive communication.

Although a particular embodiment of the present invention is herein disclosed for purposes of explanation, various modifications thereof, after study of this specification, will be apparent to those skilled in the art to which the invention pertains.

As mentioned above, in view of the present invention, while a plurality of communication processes are set up successively, the operator can interrupt the data communication apparatus for other operation without adverse effects on the usefulness or efficient operation of the facsimile for successive transmissions or other known types of use.

What is claimed is:

1. A data communication apparatus which is able to set up a plurality of communication processes successively via a communication line, comprising:
   data communication means;
   reserving means for making a reservation to request an interruption of the plurality of communication processes;
   informing means for notifying an operator that the communication line is not busy, in response to a reservation being made by means of said reserving means; and
   prohibiting means for prohibiting establishment of a successive communication process of said data communication means, in response to the reservation being made by means of said reserving means.

2. A data communication apparatus according to claim 1, further comprising means for displaying whether the reservation has been made.

3. A data communication apparatus according to claim 1, wherein the reservation can be made by means of said reserving means during a communication process performed by said data communication means.

4. A data communication aparatus according to claim 1, further comprising means for starting a successive communication process to be performed by said data communication means, after a predetermined time passes.

5. A data communication apparatus according to claim 1, wherein said informing means generates an alarm sound to notify the operator.

6. A data communication apparatus according to claim 1, wherein said data communication means is structured to communicate image data.

7. A data communication apparatus according to claim 1, further comprising a memory for storing data to be communicated by said data communication means.

8. A data communication apparatus which is able to set up a plurality of communication processes successively via a communication line, comprising:
   data communication means;
   an operating element for being manually operated while a communication process is being performed by said data communication means; and
   changing means for changing a time period between a termination of the communication process and a starting time of a successive communication process in accordance with whether said operating element has been operated or not.

9. A data communication apparatus according to claim 8, wherein said changing means sets longer a time period when said operating element has been operated than when said element has not been operated.

10. A data communication apparatus according to claim 8, further comprising means for notifying an operator of a release of the communication line after the communication process is terminated.

11. A data communication apparatus according to claim 10, wherein said notifying means generates a predetermined sound.

12. A data communication apparatus according to claim 8, wherein, if any other process is started during the time period, said data communication means starts the successive communication process after the other process is finished.

13. A data communication apparatus according to claim 8, further comprising means for displaying an indication as to whether or not said operating element has been operated.

14. A data communication apparatus according to claim 8, wherein said data communication means is structured to communicate image data.

15. A data communication apparatus according to claim 8, further comprising a memory for storing data to be communicated by said data communication means.

16. A data communication apparatus according to claim 8, wherein said operating element comprises an interrupting key.

* * * * *

UNITED STATES PATENT AND TRADEMARK OFFICE
CERTIFICATE OF CORRECTION

PATENT NO. : 4,897,869

DATED : January 30, 1990

INVENTOR(S) : MASATOMO TAKAHASHI

It is certified that error appears in the above-identified patent and that said Letters Patent is hereby corrected as shown below:

AT [56] REFERENCES CITED

Attorney, Agent, or Firm,
"Fitzpatrick, Cella Harper & Scinto" should read
--Fitzpatrick, Cella, Harper & Scinto--.

COLUMN 1

Line 21, "broad casting" should read --broadcasting--.

COLUMN 2

Line 31, "what" should read --that--.

COLUMN 5

Line 33, "aparatus" should read --apparatus--.

Signed and Sealed this

Fifteenth Day of October, 1991

Attest:

HARRY F. MANBECK, JR.

*Attesting Officer*  *Commissioner of Patents and Trademarks*